(12) United States Patent
Andersson et al.

(10) Patent No.: US 6,234,109 B1
(45) Date of Patent: May 22, 2001

(54) APPARATUS AND METHOD FOR RECOGNIZING AND DETERMINING THE POSITION OF A PART OF AN ANIMAL

(75) Inventors: Lars Andersson, Södertälje; Mats Nilsson, Norsborg, both of (SE)

(73) Assignee: Alfa Laval Agri, AB, Tumba (SE)

( * ) Notice: Subject to any disclaimer, the term of this patent is extended or adjusted under 35 U.S.C. 154(b) by 0 days.

(21) Appl. No.: 09/403,127

(22) PCT Filed: Apr. 23, 1998

(86) PCT No.: PCT/SE98/00744

§ 371 Date: Oct. 14, 1999

§ 102(e) Date: Oct. 14, 1999

(87) PCT Pub. No.: WO98/47348

PCT Pub. Date: Oct. 29, 1998

(30) Foreign Application Priority Data

Apr. 23, 1997 (SE) .................................................. 9701547

(51) Int. Cl.[7] .............................. A01J 5/017; A01J 5/02; A01J 5/04
(52) U.S. Cl. ..................................... 119/14.08; 119/14.18
(58) Field of Search .............................. 119/14.08, 14.18, 119/14.03, 14.02, 14.01

(56) References Cited

U.S. PATENT DOCUMENTS

| 4,223,635 | * | 9/1980 | Akerman | 119/14.02 |
|---|---|---|---|---|
| 4,805,557 | * | 2/1989 | Van Der Lely et al. | 119/14.08 |
| 4,867,103 | * | 9/1989 | Montalescot et al. | 119/14.08 |
| 5,042,428 | * | 8/1991 | Van Der Lely et al. | 119/14.08 |
| 5,211,132 | * | 5/1993 | Farina et al. | 119/664 |
| 5,379,721 | * | 1/1995 | Dessing et al. | 119/14.08 |
| 5,446,835 | | 8/1995 | Iida et al. . | |
| 5,483,441 | | 1/1996 | Scofield . | |
| 5,784,994 | * | 7/1998 | Van Der Lely et al. | 119/14.08 |
| 5,865,138 | * | 2/1999 | Van Der Lely et al. | 119/14.02 |
| 5,934,220 | * | 8/1999 | Hall et al. | 119/14.08 |

FOREIGN PATENT DOCUMENTS 0 727 355 A1    8/1996   (EP) .

* cited by examiner

Primary Examiner—Thomas Price
(74) Attorney, Agent, or Firm—Melvin I. Stoltz (57) ABSTRACT

The present invention relates to an apparatus and a method for recognizing and determining the position of a part of an animal. The apparatus comprises a source of structured light for illuminating a region expected to contain at least one of the part in such a way that an object illuminated by the light will have at least one illuminated area with a very distinct outline in at least one direction, an image capture and processor device arranged to capture and process the at least one image formed by the light and a control device to determine if the illuminated object is the part by comparing the image of the illuminated object to reference criteria defining different objects, and if the illuminated object is established to be the part of the animal, the position thereof is established, and animal related device and a device to guide the animal related device towards position of the part are provided.

16 Claims, 10 Drawing Sheets

APPARATUS AND METHOD FOR RECOGNIZING AND DETERMINING THE POSITION OF A PART OF AN ANIMAL

TECHNICAL FIELD OF THE INVENTION

The present invention relates to an apparatus for recognising and determining the position of a part of an animal. The present invention also relates to a method for recognising and determining the position of a part of an animal.

DESCRIPTION OF RELATED ART

Over some twenty to thirty years numerous proposals have been made for techniques by which a milking apparatus, defined as including a teat cup connected to a milking machine, a teat cleaning device and a teat examination device, can be applied to a teat of a milk animal, such as a cow, by automatic means so as to avoid the need for attendance by an operator during the procedure of milking an animal.

As automatic techniques for the rest of the milking procedure have been available for some time, automation of the teat-cup application stage has become the main obstacle to the development of a fully-automatic milking procedure which does not require continuous attendance and enables the so-called "milking on demand" regime.

For many reasons, e.g. animal safety and comfort, milk hygiene and economic efficiency, the application stage has to be extremely reliable. That is a teat-cup must be quickly and correctly applied to a teat on every occasion when an animal presents for milking. Also, the equipment for carry out the application stage has to work in difficult conditions and must to be durable while not being too expensive.

EP-A-306 579 discloses a combination of a general sensor and local sensor to guide a teat cup onto a teat. The general sensor is mounted alongside the stall and projects a sheet of light derived form a laser towards the region where the udder and teats of an animal in the stall for milking will be present. The sheet of light is incident on an udder and teats when present and produces lines of light on the udder and teats. The sheet of light can be swept through the region to an appropriate position. A camera is mounted as part of the sensor and forms an image of the lines. The image includes discontinuous lines for the teats where illuminated by the sheet of light. These lines are analysed in a control arrangement so as to find the position of the teat(s) and calculate coordinates by triangulation for two horizontal axis and vertical axis. Reference values for the coordinates stored in the control arrangement assist in analysis by limiting the search and calculating time. The calculated coordinates are used to bring the local sensors in range of a teat. Knowledge of the reference coordinates may be used to limit the image analysis to the part of the image where the teats are expected to be found, thereby reducing the calculation time.

EP-A2-647 393 discloses an implement for milking an animal, such as a cow. The implement includes a robot arm able to carry teat cups, a laser transmitter element and a receiver element. The receiver element includes a diode detector, which supplies a signal determined by three parameters: the distance d from the sensor means to the object, and the angles $\alpha_1$ and $\alpha_2$ which indicate the initial angle and the final angle, respectively, of the laser beam moving across the object. This implement makes use of a conventional animal recognition data source for identifying the animal when it arrives in the milking parlour. The animal recognition is of importance to this implement to the extent that thereby is known for each animal the position of the teats of the animal's udder relative to a fixed point on the animal.

The first disclosure (EP-A 306 579) has the disadvantage that two sensors are needed and that one has to be mounted alongside the stall in an exposed position.

The disclosures mentioned above all require the use of what is called historical data about the animals, i.e. where the teats are positioned on the udder at a previous milking session. They also require the use of stalls for the animals to be placed in.

SUMMARY OF THE INVENTION

It is an object of the invention to provide an improved teat location technique for automatic milking procedures.

According to the invention there is provided an apparatus for recognising and determining the position of at least one part of an animal. The apparatus comprises a source of structured light for illuminating a region expected to contain said at least one part in such a way that an object illuminated by said light will have at least one illuminated area with a very distinct outline in at least one direction. The apparatus also comprises an image capture and processor means arranged to capture and process at least one image formed by said light and a control means to determine if the illuminated object is said part by comparing the image of the illuminated object to reference criteria defining different objects, and if said illuminated object is established to be said part of the animal, the position thereof is established. The apparatus further comprises an animal related device and means to guide the animal related device towards the determined position of said part. The main advantage with the apparatus according to the present invention is that it does not require the use of what is called historical data about the animals. The animals do not need to be placed in special stalls, i.e. they can walk around unobstructedly. Another advantage is that it is easy to distinguish between different parts of an animal.

Advantageously, the image capture and processor means is a digital camera comprising optical sensor elements arranged in a matrix form and a processor means, wherein said optical sensor elements and said processor means are integrally formed on a substrate. Hereby is achieved that the apparatus will work fast and be able to handle the situation when the animal is moving in a better way.

Preferably, the optical sensor elements are photo diodes, and said digital camera also comprises threshold means for adjusting a threshold value, whereby signals from said photo diodes will be ignored if their levels are below said threshold value. Hereby is achieved that the illuminated object can be more easily separated from the background.

Advantageously, the apparatus also comprises a robot arm, wherein said source of structured light is arranged on the robot arm.

According to a first embodiment of the apparatus according to the present invention, the source of structured light is a laser emitting device, and each area is in the form of a line or a dot and the number of lines or dots is such that the control means is allowed to identify the illuminated object. Hereby is achieved that the illuminated object will be easily identified.

According to a second embodiment of the apparatus according to the present invention, the source of structured light is a lamp having a screen to clearly delimit the light from the lamp in one direction. Hereby is achieved that the illuminated object will be easily identified in another way.

Preferably, the apparatus also comprises at least one lens associated with said screen.

Another object of the invention is to provide a method for recognising and determining the position of at least one part of an animal. The method comprises the following steps:

illuminating with structured light a region expected to contain said at least one part in such a way that an object illuminated by said light will have at least one illuminated area with a very distinct outline in at least one direction, capturing and processing at least one image formed by said light, determining if the illuminated object is said part by comparing the image of the illuminated object to reference criteria defining different objects, and if said illuminated object is established to be said part of the animal, the position thereof is established, and providing information for guiding an animal related device towards the determined position of said part. The main advantage with the method according to the present invention is that it does not require the use of what is called historical data about the animals. The animals do not need to be placed in special stalls, i.e. they can walk around unobstructedly. Another advantage is that it is easy to distinguish between different parts of an animal.

Advantageously, the method comprises the step:

capturing and processing the image by viewing the region with a digital camera comprising optical sensor elements arranged in a matrix form and a processor means, wherein said optical sensor elements and said processor means are integrally formed on a substrate. Hereby is achieved that the method will be fast and be able to handle the situation when the animal is moving in a better way.

Preferably, the method also comprises the step:

directing the digital camera along a view axis from below and through the structured light.

Advantageously, the method also comprises the step:

adjusting a threshold value with the aid of threshold means comprised in the digital camera, whereby signals from said optical sensor elements will be ignored if their levels are below said threshold value. Hereby is achieved that the illuminated object can be more easily separated from the background.

According to a first embodiment of the method according to the present invention, the method comprises the steps:

illuminating said object with a least one laser emitting beam, wherein each illuminated area is in the form of a line or a dot, and where the number of lines or dots is such that it allows or identifying the illuminated object. Hereby is achieved hat the illuminated object will be easily identified.

According to a second embodiment of the method according to the present invention, the method comprises the step:

illuminating said object with a lamp, and delimiting said light from the lamp in one direction with a screen.

Hereby is achieved that the illuminated object will be easily identified in another way.

Preferably, the method also comprises the step:

concentrating said light from the lamp with at least one lens.

The basis of the present invention is to "virtually paint" different objects with the aid of structured light, so that the objects are illuminated at one or several moments, giving several e.g. horizontal lines on the objects. With this technique it is easy to identify the outlines of different objects. These identified outlines of an object and reference criteria defining e.g. a teat are used to determine if the illuminated object is a teat. Then the position of an established teat is determined.

Embodiments of the invention will now be described with a reference to the accompanying drawings, in which:

DETAILED DESCRIPTION OF EMBODIMENTS

Figure 1:
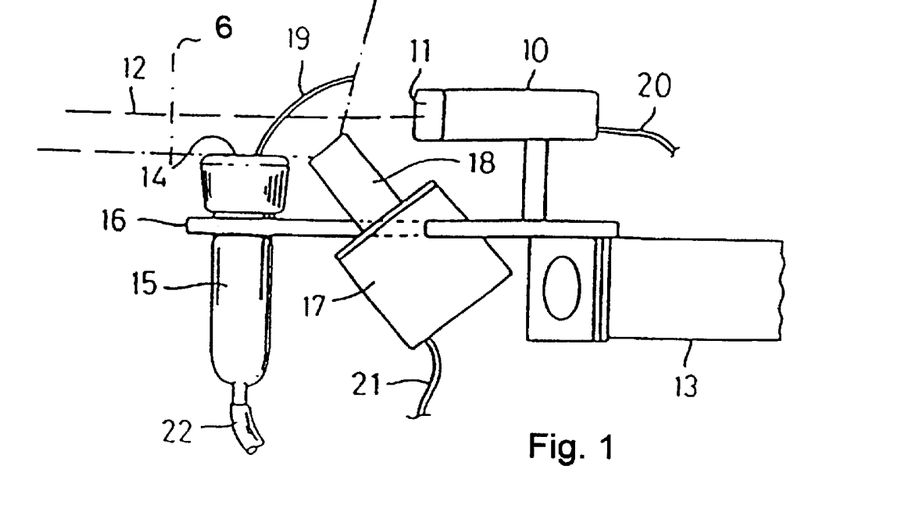
FIG. 1 shows a schematic diagram of an apparatus to form a teat-distinguishing image.

FIG. 1 shows a schematic diagram of an apparatus to form a teat-distinguishing image. The apparatus comprises a source 10 of structured light 12, in this example a small laser 10 such as a 5 milliwatt device from the firm Vector Technology, England, fitted with a lens 11 to provide a light sheet 12 of an included angle of some 60° to 80° with uniform illumination. Such a laser is a tube about 12 millimetres in diameter and 75 millimetres long with a fairly thin connection cable so it is not a severe additional load for a teatcup-carrier robot arm 13, even when mounted at the outer end of the robot arm 13. The laser 10 is positioned to direct the sheet of light 12 a small distance above the mouth 14 of a teat-cup 15 when in the carrier 16 of the robot arm 13. The carrier 16 of the robot arm 13 can also carry other different animal related devices, se e.g. FIGS. 5a, b and c.

An image capture means 17, e.g. a compact solid state camera 17 is also mounted on the animal-related-device-carrier 16. This camera 17 is a ½ inch (12 mm) charge coupled device camera (CCD-camera) fitted with a lens 18 to give a 100° angle of viewing 19 in the vertical plane. The camera 17 is positioned at an angle to the light sheet 12 so that one extreme of the angle of view is on or below e.g. the mouth 14 of the teat cup 15, and therefore below the light sheet 12, while the other extreme is directed to the rear of a perpendicular to the plane of the light sheet 12. This positioning of the camera view angle assists in distinguishing between objects at different distances from the camera 17.

Figure 2:
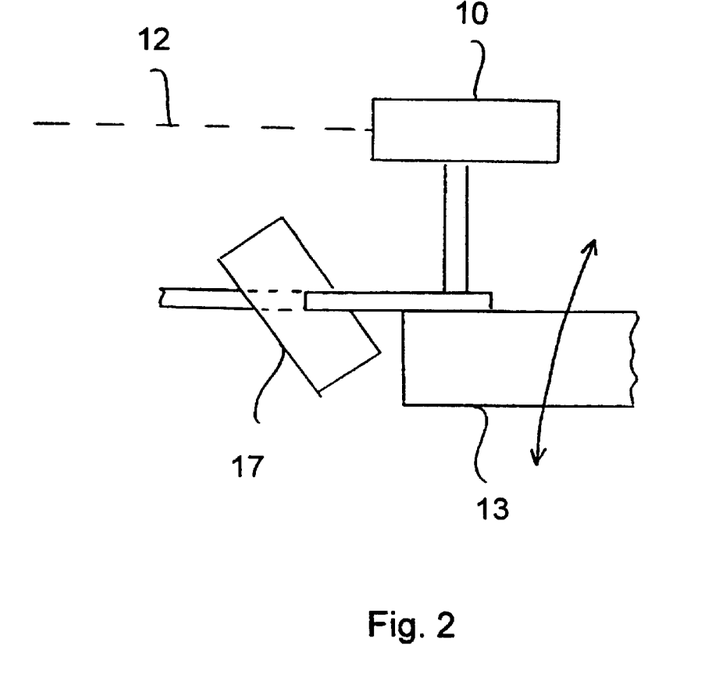
FIG. 2 shows a schematic diagram of a first way of performing scanning movement.
Figure 3:
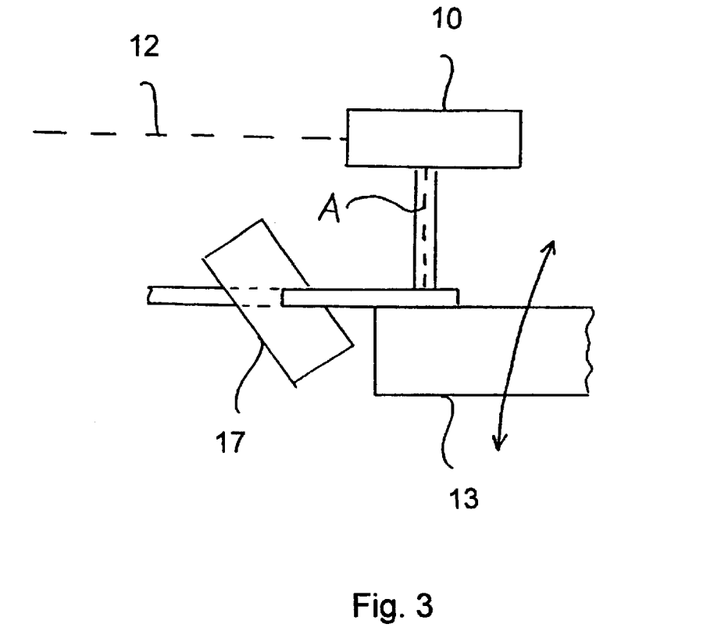
FIG. 3 shows a schematic diagram of a second way of performing scanning movement.

The apparatus also comprises a support means by means of which the light sheet 12 (in the form of a laser emitting beam) performs a scanning movement in a substantially horizontal plane. According to another embodiment of the apparatus of the present invention, the apparatus also comprises a support means by means of which the light sheet 12 (in the form of a laser emitting beam) performs a scanning movement in a substantially vertical plane. FIGS. 2 and 3 show different ways of performing a scanning movement. In FIG. 2 there is disclosed the situation where the structured light 12 is in the form of a line or lines and wherein the scanning movement is performed by raising and lowering the robot arm 13 and consequently the source 10 of structured light 12, e.g. a laser emitting device. In FIG. 3 there is disclosed the situation where the structured light 12 is in the form of a dot shaped beam. The scanning movement is performed in two steps. First of all the laser emitting device 10 is turned around an axis A, which gives rise to a line, if the turning of the laser emitting device 10 is performed fast enough. Secondly, this line is made to perform a scanning movement by raising and lowering the robot arm 13 and consequently the laser emitting device 10.

In FIG. 1 there is also, with a dotted line, disclosed a screen 6 or a raster 6 arranged in front of the laser emitting device 10. The screen 6 can be provided with slits or a plurality of through holes (see FIGS. 6 and 7).

A connection to energise the laser 10 is indicated at 20, signal and energisation connections for the camera 17 at 21 and the vacuum line for the teat-cup 15 at 22. The robot arm 13 can be of the type shown in GB-PS 2,226,941 or GB-PS 2,258,382 or other suitable type. The control instructions for the robot arm are derived from the video camera information.

Figure 4:
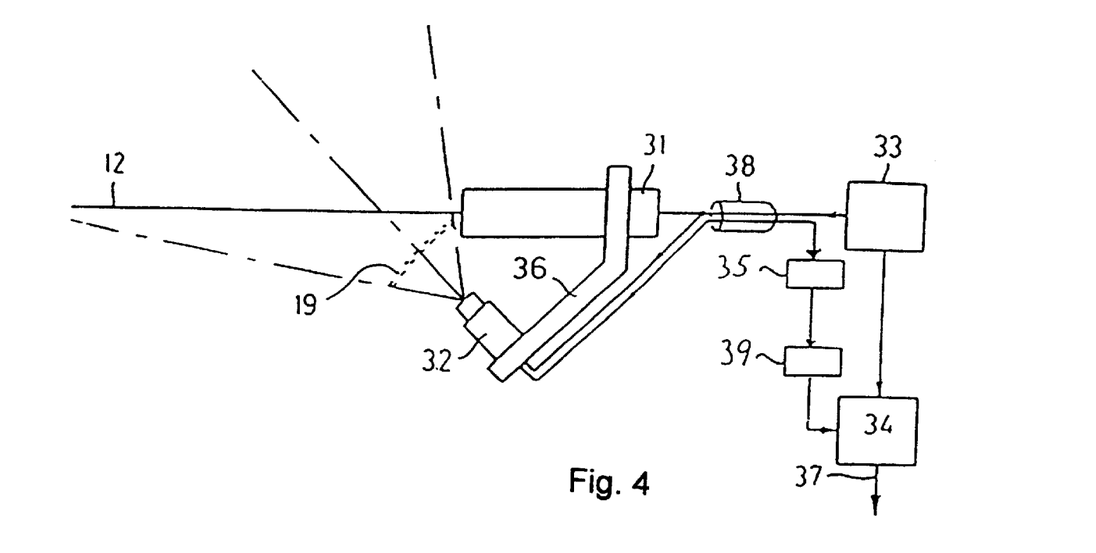
FIG. 4 shows a block diagram of image processing hardware, FIGS. 5a, b, c show different animal related devices used in connection with the apparatus according to the present invention.

FIG. 4 shows a block diagram of units of an image capture and processing arrangement. In FIG. 4 a laser stripe generator is indicated at 31 and a camera to view an image produced by the laser stripe is indicated at 32. Both are on the robot arm, part of which is shown at 36. A power supply unit 33 energises electronic circuit units 34 and 35 and camera 32, if needed. Unit 35 processes the image information from camera 32 and supplies image position information to unit 34 which provides control information to output 37 for the robot (not fully shown). Power and signal cables are held together 38 on the robot arm.

In FIG. 4 there is also disclosed a control means 39 arranged to determine if the illuminated object is e.g. a teat by the use of reference criteria defining e.g. a teat, wherein the image of the illuminated object is compared to reference criteria defining different parts of said animal.

Figure 5:
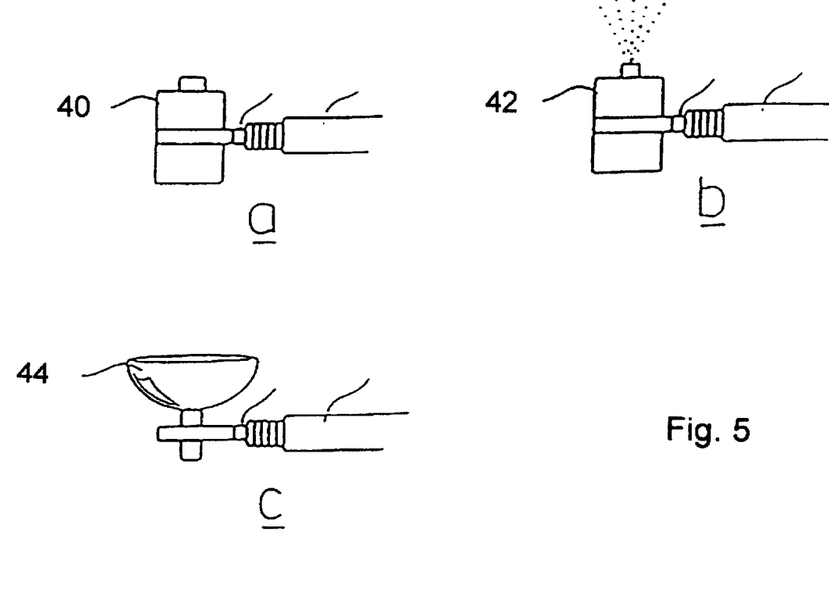

FIGS. 5a, b and c show different animal related devices used in connection with the apparatus according to the present invention. FIG. 5a shows a video camera 40 which can be used for inspecting injuries on the udder and/or the teats. FIG. 5b shows a spray device 42 for spraying of the udder and the teats, e.g. for cleaning of these. FIG. 5c shows a cup 44, which to a suitable level is filled with iodine in which the teats are dipped after finished milking.

The apparatus for recognising and determining the position of a part of an animal according to the present invention can also comprise a memory device (not shown) for storing different image signals. The memory device can e.g. be included in the image signal processing unit 35, which process the different image signals to distinguish between relevant and not relevant lines or dots, whereby a relevant line is defined as a line with a length between 2 cm and 7 cm, and relevant dots are defined as dots arranged on an imaginary line with a length between 2 cm and 7 cm to provide a complete image of illuminated objects. The apparatus further comprises a filtering means (not shown) to filter the image signals and eliminate not relevant lines or dots. The filtering means can e.g. also be included in the image signal processing unit 35 connected to and situated before the memory device. The apparatus can also be provided with pivotal means, by means of which the laser emitting beam performs a scanning movement in a substantially horizontal plane or a substantially vertical plane. The pivotal means can e.g. be constituted by a bidirectionally controllable stepper motor. The apparatus can also comprise a means for during scanning moving the scanning plane upwardly from a position below the teat to a position wherein the position of the teat can be determined. The scanning plane is moved stepwise in such a way that a distance between two consecutive scanning planes is greater than the width of the laser emitting beam.

Figure 6A:
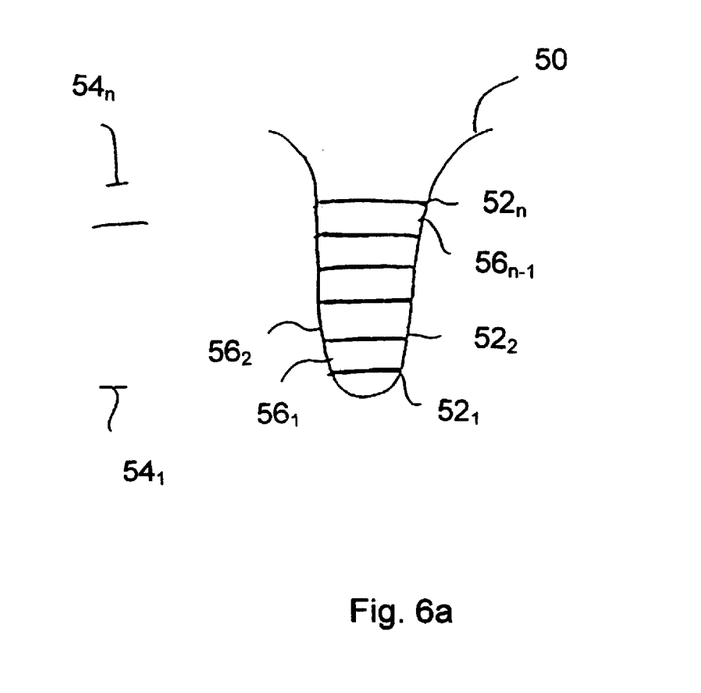
FIG. 6a, is a first example of the images captured by the camera.

FIG. 6a is a first example of the images captured by the camera 17; 32. FIG. 6a shows an example wherein the illuminated object is a teat 50. FIG. 6 shows the complete image after processing in the image signal processing means 35. In this case the apparatus according to the present invention comprises the pivotal means and the means for moving the scanning plane so that the laser emitting beam performs a scanning movement in a substantially horizontal plane. In the first scanning plane the laser emitting device 10; 31 illuminates the teat 50 with a first line $52_1$. The image signal of this line $52_1$ is captured by the camera 17: 32 and stored in the memory device. Then the scanning plane is moved upwardly and the laser emitting device 10; 31 illuminates the teat 50 with a second line $52_2$. The image signal of this second line $52_2$ is also captured by the camera 17; 32 and stored in the memory device. This process continues until the object can be identified, e.g. as a teat. In this case the teat 50 is illuminated with n lines, where $n \geq 2$. The image signals of the different lines $52_1, \ldots 52_n$ are stored in the memory device and "buffered" in the image signal processing means 35 to a complete image. The different image signals also comprises not relevant lines $54_1, \ldots 54_n$ due to e.g. disturbances. These not relevant lines $54_1, \ldots 54_n$ are eliminated by the filtering means so they are actually eliminated in the complete image. They are only showed in FIG. 4 to explain the process. In the complete image the different lines $52_1, \ldots 52_n$ are separated by not illuminated areas $56_1, \ldots 56_{n-1}$. The complete image will have a distinct contrast and the different objects can easily be identified by the control means 39, which uses reference criteria defining e.g. a teat to determine if the object is a teat. Then the image signal processing means 35 determines the position of the established teat.

In FIG. 6a, the teat 50 is illuminated with n lines, in this case at least 6 lines. However, experiments have proved that a sufficient result, i.e. the object can be identified, e.g. as a teat, can be achieved with only 2 lines. This situation and preferred embodiment is disclosed in FIG. 6b.

Figure 6B:
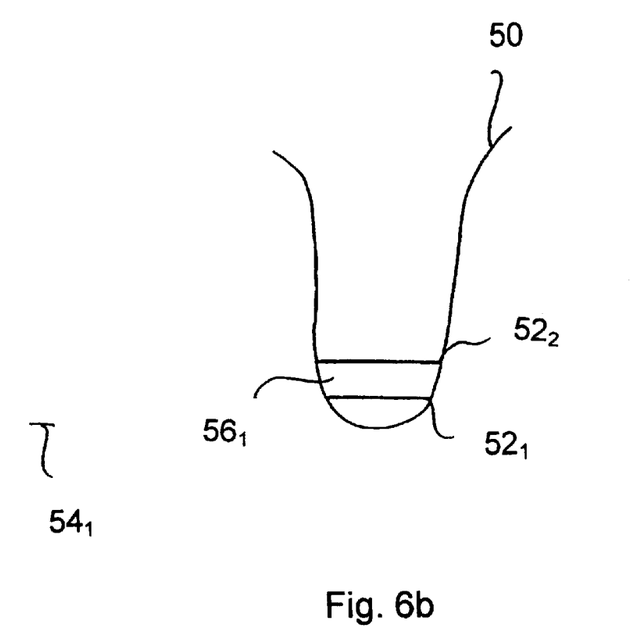
FIG. 6b, is an example of the images captured by the camera, where the number of lines are 2.

The complete image of FIG. 6a, or 6b can also be accomplished with an apparatus comprising a screen 6 with slits or a raster 6 arranged in front of the laser emitting device instead of the pivotal means. In these cases the laser emitting beam is not performing a scanning movement.

The lines $52_1, \ldots 52_n$ disclosed in FIG. 6a, or 6b can also be divergent lines (not showed). This can be accomplished both with a screen with slits or a raster or with a pivotal means.

Figure 7:
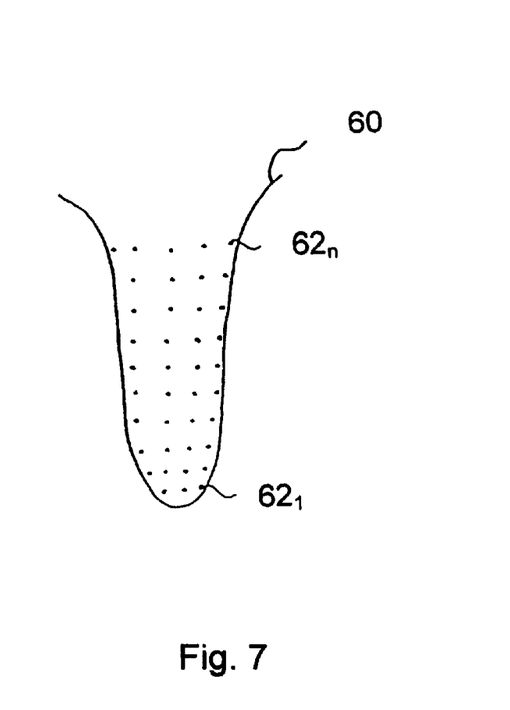
FIG. 7 is a second example of the images captured by the camera.

FIG. 7 is a second example of the images captured by the camera 17; 32. FIG. 7 shows an example wherein the illuminated object is a teat 60. FIG. 7 shows the complete image after processing in the image signal processing means 35. In this case the apparatus according to the present invention comprises a screen with a plurality of through holes arranged in a predetermined pattern, arranged in front of the laser emitting device 10; 31. When the teat 60 is illuminated with the laser emitting beam 12 it gives rise to a plurality of dots $61_1, \ldots 62_n$ arranged in the image.

The rest of the process is similar to the one described in connection with FIGS. 6a, and 6b.

Figure 8A:
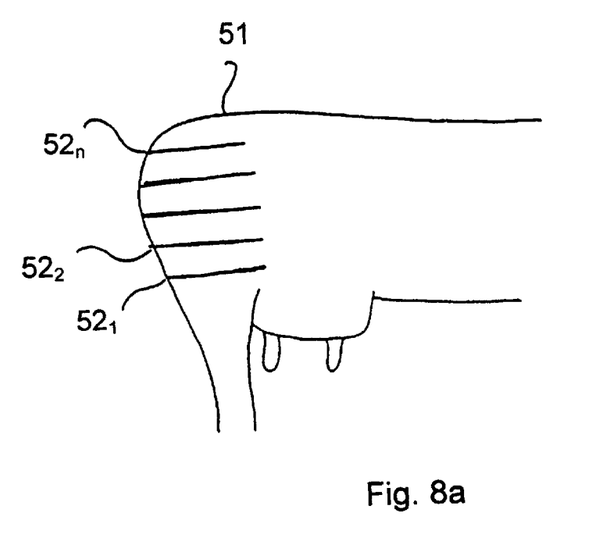
FIG. 8a, is a third example of the images captured by the camera.

FIG. 8a is a third example of the images captured by the camera 17; 32. FIG. 8a shows an example wherein the illuminated object is the rump 51 of a cow. FIG. 8a shows the complete image after processing in the image processing means 35. In this case the rump 51 of the cow is illuminated with n lines, where $n \geq 2$. The image signals of the different lines $52_1, \ldots 52_n$ are stored in the memory device and "buffered" in the image signal processing means 35 to a complete image. In this case the reference criteria are longer lines than in the case in accordance with FIGS. 6a, and 6b. The rest of the process is similar to the one described in connection with FIGS. 6a and 6b.

Figure 8B:
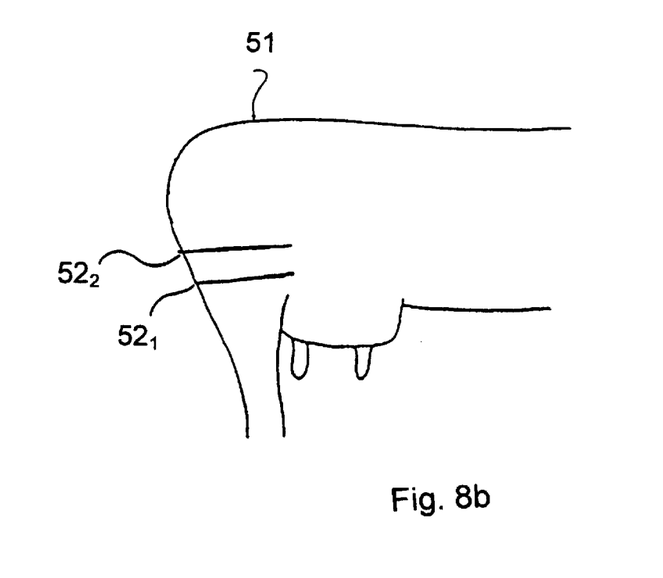
FIG. 8b, is an example of the images captured by the camera, where the number of lines are 2.

In FIG. 8b, there is disclosed the preferred embodiment where the number of lines are 2. Experiments have proved that a sufficient result can be achieved with only 2 lines, i.e. the object can be identified as a rump 51.

Figure 9:
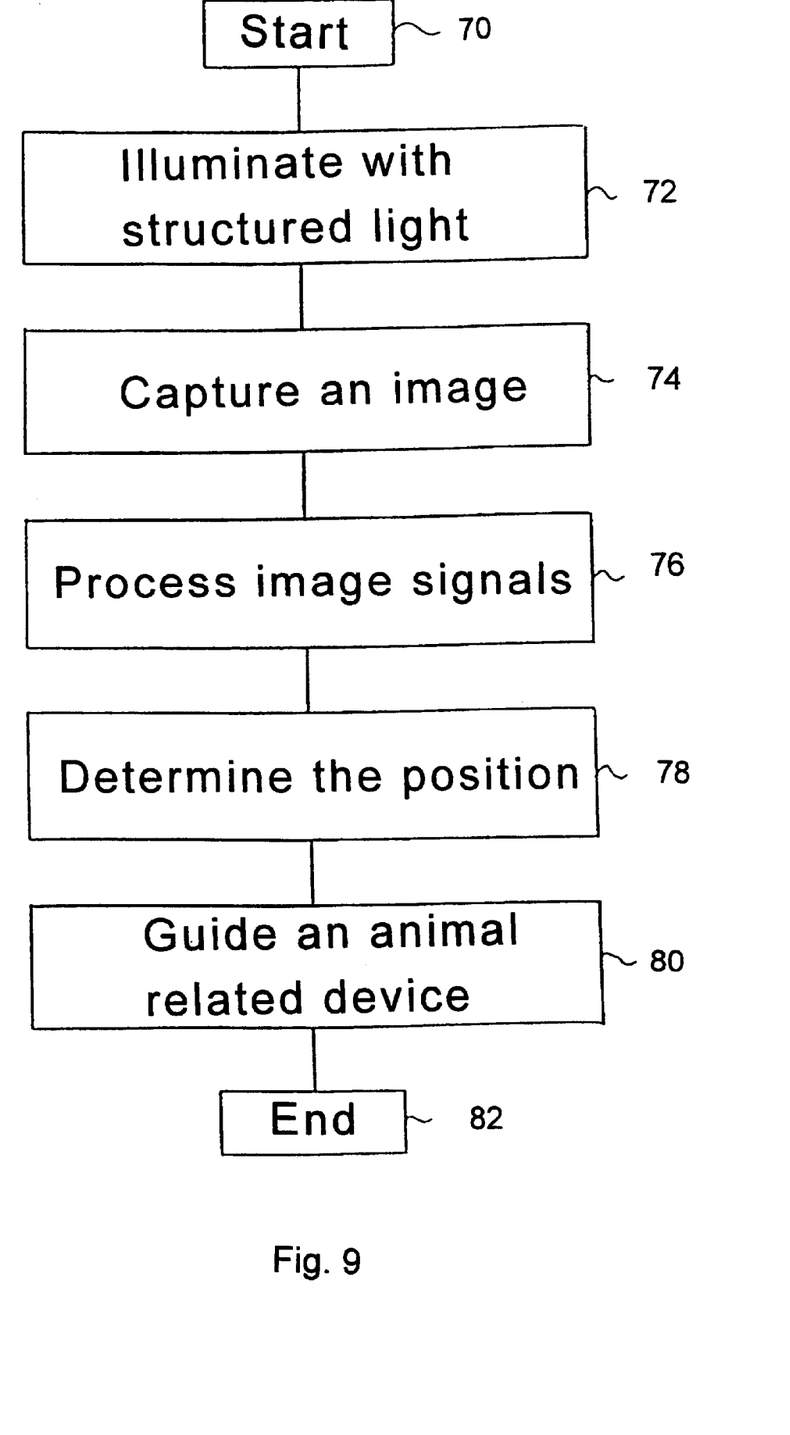
FIG. 9 is a flow chart of the method according to the present invention.

FIG. 9 is a flow chart of the method according to the present invention. The method begins at block 70. At block 72 the method continues with illuminating with structured light a region expected to contain at least one teat in such a way that an object illuminated by said light simultaneously or discrete in time is partitioned into at least two illuminated areas, where each two illuminated areas are separated by a not illuminated area. The expression area in the context when using a laser is hereby used to mean a well defined zone, with very distinct outlines. Dots and lines provided by a laser are quite distinct and well defined. The method continues at block 74 with capturing at least one image formed by said light and provide an image signal. The next step, at block 76, consists of processing said image signals to determine if the illuminated object is said part by the use of reference criteria defining e.g. a teat, wherein the image of the illuminated object is compared, by the control means 39, to reference criteria defining different objects and if said illuminated object is a part of the animal, the position thereof is established. The reference criteria can be stored in the image signal processing device 35. The method continues at block 78 with determining the position of an established part. The next step, at block 80, consists of providing information for guiding an animal related device towards the determined position of said part. The method is completed at block 82.

Figure 10:
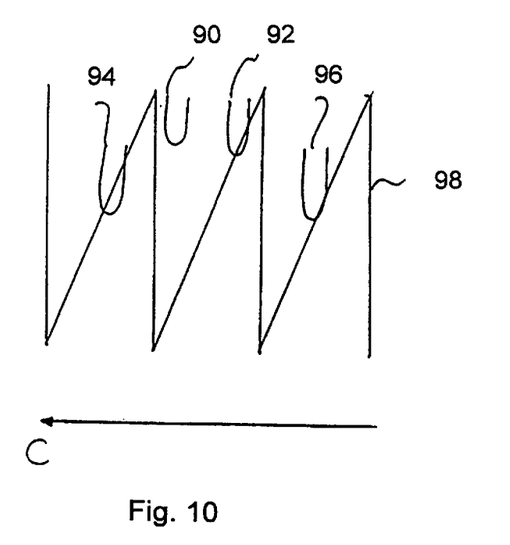
FIG. 10 shows a diagrammatic picture of the movement of the robot arm with the carrier.

FIG. 10 shows a diagrammatic picture of the movement of the robot arm with the carrier. In FIG. 10 there is disclosed four teats 90, 92, 94, 96 of a cow. The robot arm 13 (see FIG. 1) with the carrier 16, and consequently the laser emitting device 10 and the camera 17 are moving in a substantially zigzag pattern 98, in a direction from right to left in the picture, as indicated with the arrow C. At the same time as the robot arm 13 performs this zigzag movement, the laser emitting device 10 performs e.g. the scanning movement.

Figure 11:
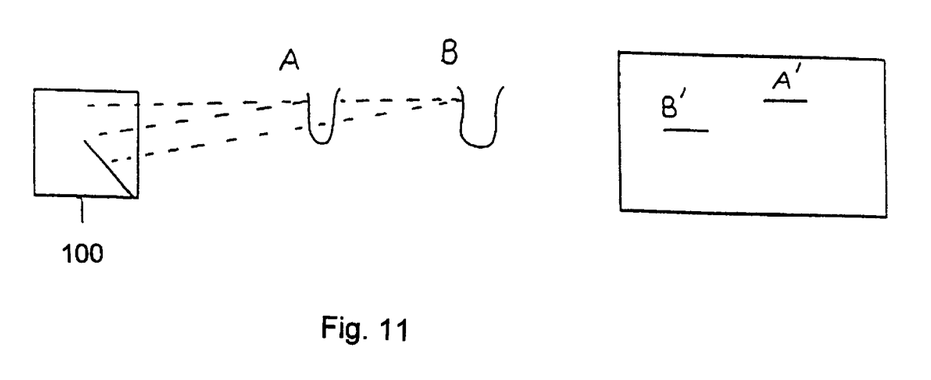
FIG. 11 shows a diagrammatic picture of the relation between the illuminated objects and the image captured by the camera.

FIG. 11 shows a diagrammatic picture of the relation between the illuminated objects and the image captured by the camera. 100 indicates the camera and the laser emitting device. In this case the laser emitting device 100 illuminates two teats A, B. The light is reflected back from the teats A, B to the camera 100, which is able to measure the positions of the lines A', B', (the right part of FIG. 11) and also the widths of the lines A', B'. As is apparent in FIG. 11 the line A' is situated above the line B' in the image 102 captured by the camera 100. This means that the teat A is nearer the camera 100 than the teat B. When the camera 100 captures an image, the image will contain a number of lines. Each line will have an x-,y-position and a length d. All these lines are grouped together, by means of the control means, into different groups in dependence of the position in a plane for each line, and the length in said plane for each line in said plane. A line which is close to an existing group is added to that group and the new position of the group is moved to a mean value position for the position of the added line and the old position of the group. The control means performs this calculation of the mean value position for each group, where each group represents an object. This calculation of a mean value position for each group means that the position for each group will be moving if e.g. the cow is moving. Each group has a range of tolerance in dependence of the searched part. All lines which are within this range of tolerance will be added to that group, while lines outside this range of tolerance will define a new group. If a line can belong to several groups, the line is added to the nearest group.

Figure 12:
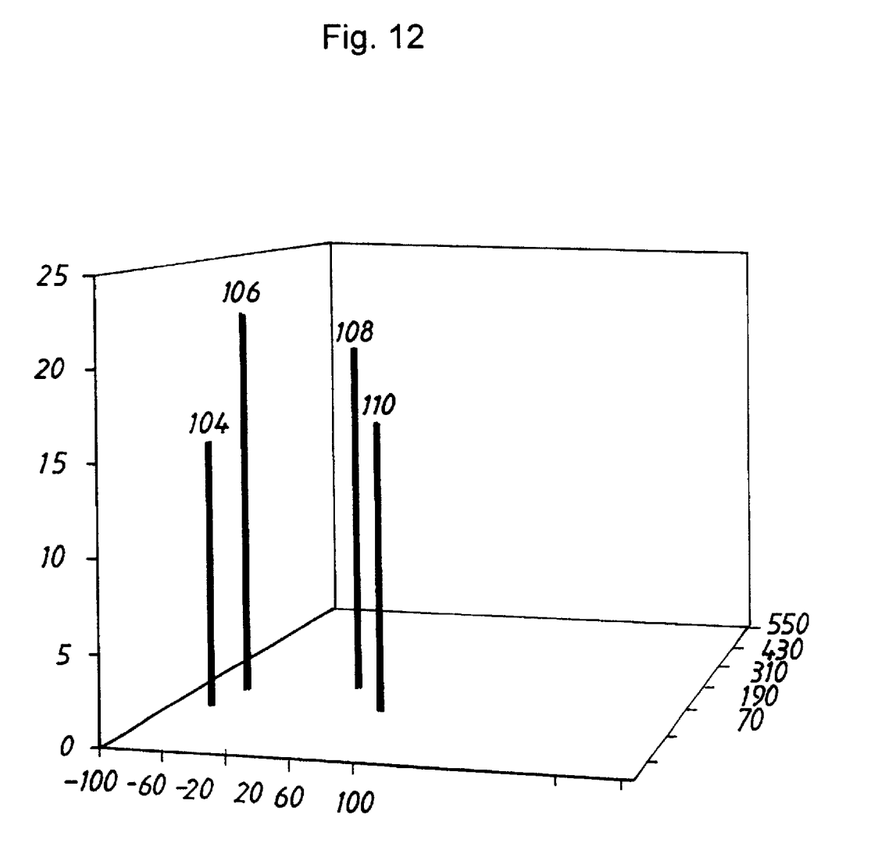
FIG. 12 is a diagram showing the positions of the identified teats of a cow.

FIG. 12 is a diagram showing the positions of the identified teats of a cow. In this diagram there is disclosed four different groups 104, 106, 108, 110 containing different number of lines. In this case each group represents a teat.

Figure 13:
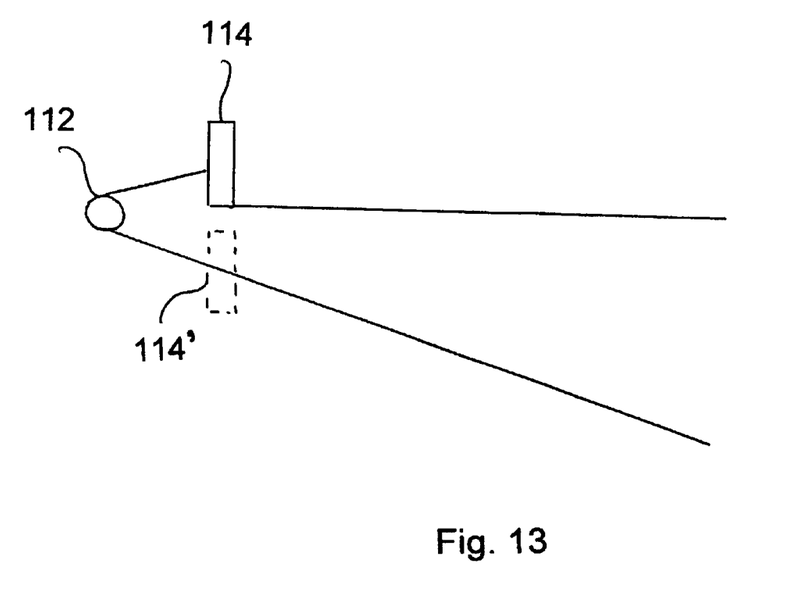
FIG. 13 shows a schematic diagram of another embodiment of a source of structured light, FIGS. 14a, b are other examples of the images captured by the camera, where the source of structured light is in accordance with the embodiment disclosed in FIG. 13.

FIG. 13 is a diagram showing another embodiment of a source of structured light. In this embodiment the light emanates from a source of light 112, e.g. a lamp 112. In front of the lamp a screen 114 is positioned to clearly delimit the light from the lamp 112 in one direction. Of course, the screen can be positioned the other way around as in FIG. 13 is depicted with "the screen" 114'. The combination of a lamp 112 and a screen 114 arranged in this way will, if the distance between the lamp 112 and the screen 114 is not too small, give rise to a distinct and sharp outline in one direction, as will be disclosed in FIGS. 14a and b.

Alternatively, one or more lenses can be added in front of, behind or both in front of and behind the screen 114.

Figure 14A:
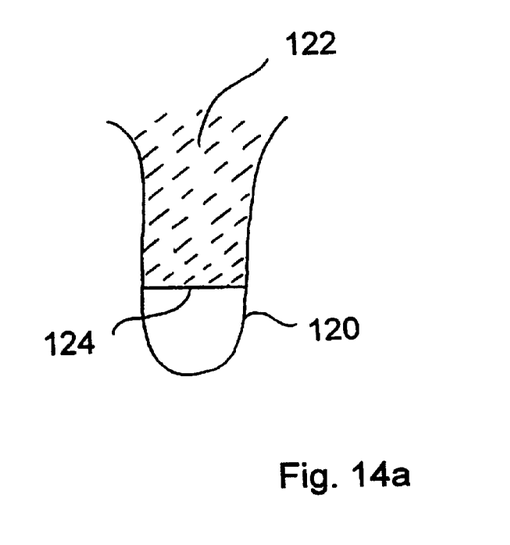
Figure 14B:
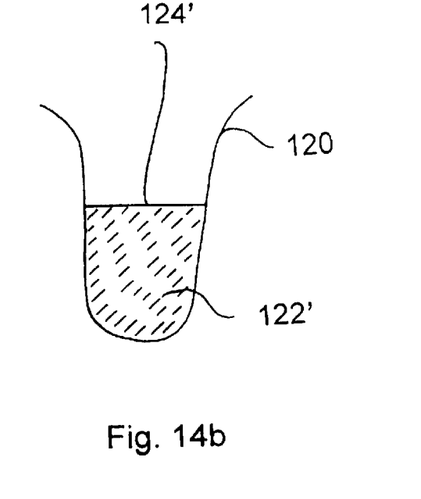

FIG. 14a, is another example of the images captured by the camera 17; 32. The light in this example emanates from the embodiment disclosed in FIG. 13. FIG. 14a shows an example wherein the illuminated object is a teat 120. FIG. 14a shows the complete image after processing. The teat 120 is illuminated by the lamp 112 and the illuminated area 122, disclosed with dashed lines, has a distinct outline 124 in one direction. This distinct outline 124 is accomplished with the aid of the screen 114 or a combination of a screen and lenses. The complete image will have a distinct contrast and the different objects can easily be identified by the control means 39, which uses reference criteria defining, e.g. a teat to determine if the object is a teat. Then the position of the established teat is determined.

FIG. 14b, is another example of the images captured by the camera 17; 32. The light in this example emanates from the embodiment disclosed in FIG. 13. FIG. 14b shows an example wherein the illuminated object is a teat 120. The teat 120 is illuminated by the lamp 112, but in this example the screen 114 is positioned as indicated with a dashed line. This gives rise to an illuminated area 122' which has a distinct outline 124' in one direction. The rest of the process is similar to the one described in connection with FIG. 14a.

Figure 15:
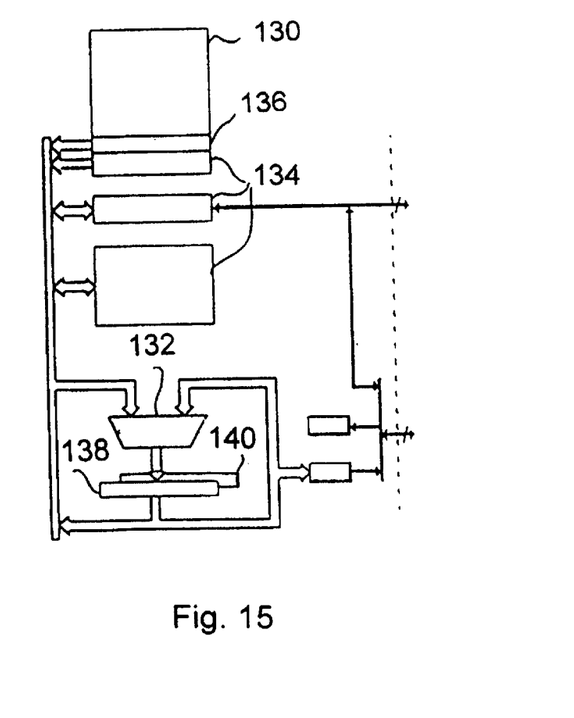
FIG. 15 shows a block diagram of the main parts of another embodiment of the image capture means.

FIG. 15 shows a block diagram of the main parts of another embodiment of the image capture means. The camera 17; 32 disclosed in FIGS. 1 and 4 is a CCD-camera (charged coupled device). This camera 17; 32 can also be a digital camera of the type which comprises optical sensor elements 130 arranged in a matrix form and a processor means 132, wherein the optical sensor elements 130 and the processor means 132 are integrally formed on a substrate. In a preferred embodiment the matrix of optical sensor elements 130 comprises a 256×256 array of photo diodes 130, e.g. MAPP2200 (Matrix Array Picture Processor) from the firm IVP, Integrated Vision Products AB, Sweden, whereby this device is capable of capturing a full image. Each photo diode 130 corresponds to a pixel. The built-in processor means 132 handles a row of pixels in parallel. The disclosed device also comprises a number of digital registers 134 and an analog register 136. The result of a computation is stored in an Accumulator 138 or, if the instruction is arithmetic, also in a Carry Register 140. The device thus handles all of the critical tasks found in an image processing system: image sensing, digitization and data reduction. The different elements disclosed in FIG. 15 are integrally formed on the same semiconductor chip. The matrix sensor consists of 256 rows, each containing 256 photo diodes 130. Image information is read out line-by-line to a parallel array of read amplifiers (not disclosed). The photo diode charge is stored immediately in the analog register 136 which is coupled to a threshold means (not disclosed). The user of this device can completely control which rows in the sensor are to be read out and in what sequence. This makes it possible for the sensor to operate with different exposure times for different areas of the image. Once a line of image data has been moved to the analog register 136, the user may choose to threshold the image information at a preselected level. This is done with the aid of threshold means. A suitably chosen threshold value can cause the actual object to be easily separated from the background. Since it is possible to set both the threshold value and the exposure time adaptively, it is possible to account for varying conditions of light intensity and object reflectivity. The use of this type of camera instead of a CCD-camera in the apparatus according to the present invention will make the apparatus work faster. This means as well that the apparatus also more easily will handle the situation when the animal is moving.

The structured light mentioned in the description is not limited to the embodiments disclosed in the figures. The structured light can also be in the form of infrared light or manipulated light which has a certain shape, e.g. a line or dots. The manipulation can be comprised of that light will pass a combination of e.g. lenses and screens.

The invention is not limited to the embodiment described in the foregoing. It will be obvious that many different modifications are possible within the scope of the following claims. Furthermore, it should be noted that even though the described apparatus and method do not require the use of historical data of the animal, such use is not excluded, as it may enhance the performance of said apparatus and method.

What is claimed is:

1. An apparatus for recognizing and determining the position of at least one part of an animal, wherein the apparatus comprises a source (10; 31) of structured light (12) for illuminating a region expected to contain said at least one part wherein an object is illuminated by said light (12), an image capture and processor means (130, 132) arranged to capture and process at least one image and a control means (39) to determine if the illuminated object is said part by comparing the image of the illuminated object to reference criteria defining different objects, and if said illuminated object is established to be said part of the animal, the position thereof is established, an animal related device (15; 40; 42; 44) and means to guide the animal related device (15; 40; 42; 44) towards the determined position of said part.

2. The apparatus defined by claim 1, wherein said object illuminated by said light (12) will have at least one illuminated area with a very distinct outline in at least one direction, and in that said at least one image captured by said image capture and processor means (130, 132) is formed by said light (12).

3. The apparatus defined by claim 2, wherein said image capture and processor means (132, 132) is a digital camera comprising optical sensor elements (130) arranged in a matrix form and a processor means, wherein said optical sensor elements (130) and said processor means (132) are integrally formed on a substrate.

4. The apparatus defined by claim 3, wherein the optical sensor elements are photo diodes (130), and said digital camera also comprises threshold means for adjusting a threshold value, whereby signals from said photo diodes (130) will be ignored if their levels are below said threshold value.

5. The apparatus defined by claim 1, wherein said apparatus also comprises a robot arm (13), wherein said source (10; 31) of structured light (12) is arranged on the robot arm (13).

6. The apparatus defined by claim 1, wherein the source (10; 31) of structured light (12) is a laser emitting device (10; 31), and wherein each area is in the form of a line or a dot and the number of lines or dots is such that the control means is allowed to identify the illuminated object.

7. The apparatus defined by claim 1, wherein the source of structured light is a lamp (112) having a screen (114) to clearly delimit the light from the lamp (112) in one direction.

8. The apparatus defined by claim 7, wherein the apparatus also comprises at least one lens associated with said screen (114).

9. A method for recognizing and determining the position of at least one part of an animal, which method comprises the following steps:

A. illuminating with structured light a region expected to contain said at least one part, B. capturing at least one image, C. determining if the illuminated object is said part by comparing the image of the illuminated object to reference criteria defining different objects, and if said illuminated object is established to be said part of the animal, the position thereof is established, and D. providing information for guiding an animal related device towards the determined position of said part.

10. The method defined by claim 9, further comprising:

E. illuminating with structured light in such a way that an object illuminated by said light will have at least one illuminated area with a very distant outline in at least one direction, and F. capturing at least one image formed by said light.

11. The method defined by claim 9, further comprising:
E. capturing and processing the image by viewing the region with a digital camera comprising optical sensor elements arranged in a matrix form and a processor means wherein said optical sensor elements and said processor means are integrally formed on a substance.

12. The method defined by claim 11, further comprising:
F. directing the digital camera along a view axis from below and through the structured light.

13. The method defined by claim 12, further comprising:
G. adjusting a threshold value with the aid of threshold means comprised in the digital camera, whereby signals from said optical sensor elements will be ignored if their levels are below said threshold value.

14. The method defined by claim 9, further comprising:
E. illuminating said object with at least one laser emitting beam, wherein each illuminated area is in the form of a line or a dot, and
F. where the number of lines or dots is such that it allows for identifying the illuminated object.

15. The method defined by claim 9, further comprising:
E. illuminating said object with a lamp, and
F. delimiting said light from the lamp in one direction with a screen.

16. The method defined by claim 15, further comprising:
G. concentrating said light from the lamp with at least one lens.

\* \* \* \* \*